United States Patent Office 3,317,401
Patented May 2, 1967

3,317,401
MICROBIOLOGICAL OXIDATION OF 7-METHYL-1,8 - NAPHTHYRIDINES TO 7 - HYDROXYMETHYL-1,8-NAPHTHYRIDINES
Eldon D. Nielson, Winston-Salem, N.C., Pat B. Hamilton, Ponca City, Okla., and David Rosi, East Greenbush, and George P. Peruzzotti, North Greenbush, N.Y., assignors to Sterling Drug Inc., New York, N.Y., a corporation of Delaware
No Drawing. Filed Oct. 25, 1963, Ser. No. 318,818
9 Claims. (Cl. 195—51)

This invention relates to processes for the microbiological oxygenation of organic compounds.

The invention resides in the concept of a process for converting the methyl radical attached in the 7-position of the 1,8-naphthyridine nucleus to the hydroxymethyl radical by the fermentative enzymatic action of an organism classified in the orders Moniliales, Mucorales, Hypocreales, Melanconiales, Sphaeriales, and Spirogyrales.

We have found variations exist in the efficiency of different genera and species of organisms within the above orders in our oxygenation process and have therefore ascertained that, by following the screening procedure hereinafter described, the effectiveness of any particular organism can readily be determined.

Among the 7-methyl compounds containing the 1,8-naphthyridine nucleus to which our process can be applied are those disclosed in the copending applications of Lesher and Gruett, Ser. Nos. 79,951 (now Patent No. 3,149,104, issued September 15, 1964) and 244,886 (now abandoned), filed Jan. 3, 1961 and Dec. 17, 1962, respectively. Both said applications also show, inter alia, certain of the 7-hydroxymethyl-1,8-naphthyridines which can be produced by the process of this invention and their synthesis by chemical means.

The structures of the products obtained by the process of the invention were established by elemental analyses and by evidence provided by ultraviolet (UV), infrared (IR), and nuclear magnetic resonance (NMR) spectra, and, by paper chromatographic mobilities.

The 7-hydroxymethyl compounds produced by the process of the invention have been tested by standard bacteriological evaluation procedures and found to have antibacterial activity, e.g., in vivo activity against *Klebisella pneumoniae*, *Escherichia coil* and *Salmonella typhimurium* in mice when administered orally in the range of about 25 to 400 mg./kg./day.

The manner of using the process will now be generally described so as to enable the person skilled in the art of microbiological chemistry to make and use the same, as follows:

GENERAL SCREENING PROCEDURE TO DETERMINE EFFICIENCY OF ANY SPECIFIC ORGANISM

Inoculate the microorganism onto Sabouraud's agar slants or other agar base media suitable for growth. Place the inoculated slants in an incubator maintained at 25° C. and allow to grow for one week. Remove the slant and add 15 ml. of sterile distilled water to it. Loosen the spores and vegetative growth from the agar with a sterile needle. Transfer the suspension to a flask containing 100 ml. of the soy-dextrose medium described below and place the flask in a rotary shaker in an incubator maintained at 25° C. at about 210 r.p.m. for twenty-four hours. After this initial time period (first stage seed), add 10 ml. of the submerged growth to each of duplicate flasks of three types of media, namely soy-dextrose, Cerelose Edamine and dextrin-cornsteep, the compositions of which are given below. Place the flasks in the shaker and allow to grow from about forty-eight to about seventy-two hours at 25° C. Add to one flask of each pair 10 mg. of any substrate 7-methyl-1,8-naphthyridine in 0.25 ml. of dimethylformamide. Add to the other flask of each pair 0.25 ml. of dimethylformamide to serve as the control. Agitate all of the flasks under the same conditions for an additional twenty-four hours and remove from the shaker. Note the growth characteristics and pH and then acidify the whole beer of each flask with 2.0 ml. of 10 N HCl and extract once with a volume of methylene dichloride equal to the volume of the beer and then once with half that volume. Remove the solvent of each extract by warming in a water bath at about 60° C. Dissolve each residue in 10 ml. of methylene dichloride for application to paper for chromatographic analysis.

The screening samples are then all chromatographed on paper using a suitable system, a preferred one being an aqueous propylene glycol-toluene-dioxane system, i.e., a mixture of nine parts (by volume) of toluene and one part of dioxane saturated with propylene glycol is used as the mobile phase and dry paper (e.g., Watman No. 1) dipped into a 35 percent aqueous propylene glycol solution and placed between two sheets of paper towel to remove the excess solvent is used as the stationary phase. The papers are photographed and the photographs are examined for ultraviolet absorbing components present in the extracts. The 7-hydroxymethyl product appears as a spot less mobile (more polar) than the starting 7-methyl compound in said preferred chromatographic system. The more polar spot is eluted from the paper strip with absolute methanol and the eluate subjected to ultraviolet spectral analysis.

Constitution of illustrative nutrient media suitable for the above screening procedure and for the batch fermentations given below in the examples are as follows:

Soy-dextrose

Soybean meal _____ g__ 5
Dextrose _____ g__ 20
NaCl _____ g__ 5
$K_2HPO_4$ _____ g__ 5
Yeast _____ g__ 5
Tap water _____ l__ 1
pH to 6.4
Autoclave at 15 lbs. per sq. in for 15 min.

Cerelose-Edamine

Cerelose (crude dextrose) _____ g__ 50
Edamine [1] _____ g__ 20
Cornsteep liquor _____ ml__ 5
Tap water _____ l__ 1
pH to 4.5
Autoclave at 15 lbs. per sq. in. for 15 min.

[1] An enzymatic hydrolysate of milk protein (Sheffield Farms Co.).

Dextrin-cornsteep

Dextrin _____ g__ 10
Cornsteep liquor _____ g__ 80
$KH_2PO_4$ _____ g__ 1
NaCl _____ g__ 1
Tap water _____ l__ 1
pH to 4.0
Autoclave at 15 lbs. per sq. in. for 30 min.

The above-described general screening procedure and nutrient media, as well as the batch fermentations given below in the specific examples, are illustrative and can be varied in different ways, e.g., by using other microorganisms whose fermentative enzymatic action is capable of effecting the oxidation of said 7-methyl-1,8-naphthyridines to the corresponding 7-hydroxymethyl compounds; by using other nitrogen sources in place of those given above, e.g., corn meal, oat meal, other protein hydrolysates, meat extract, etc.; by using other carbon sources in place of dextrose, e.g., sucrose, glucose, maltose, starch, molasses, etc.; by varying the time of addition of the substrate after addition of the medium from 0 to about 96 hours; by varying the initial pH (for addition and conversion of substrate) from about 5.0 to about 7.5, preferably between 5.5 and 6.5; by varying the quantity of substrate; by varying the rate of stirring; and, by utilizing other modifications known in the fermentative art.

Large batch fermentations and procedures for isolating sufficient quantities of crystalline 7-hydroxymethyl-1,8-naphthyridine for elementary analyses and antibacterial studies in the following specific examples will further illustrate aspects of our invention.

EXAMPLE 1

Conversion of 1,4 - dihydro-1-ethyl-7-methyl-4-oxo-1,8-naphthyridine-3-carboxylic acid to its 7-hydroxymethyl analog was accomplished as follows: A ten liter stirred fermentation of *Penicillium adametzi* (NRRL 737) using 1,4 - dihydro-1-ethyl-7-methyl-4-oxo-1,8-naphthyridine-3-carboxylic acid (known generically as nalidixic acid) as a substrate was run in order to obtain sufficient product for identification and antibacterial studies. A vegetative culture of *P. adametzi* was grown in 500 ml. flasks for forty-eight hours at 25° C. in the above described soy-dextrose medium on the rotary shaker. One liter of this growth was used to seed a fermentor containing 10 liters of medium autoclaved at 121° C. for forty-five minutes and then cooled to 25° C. The inoculated medium was then incubated for forty-eight hours under the following conditions: temp., 25° C.; filtered air flow, 2 liters/min.; agitation, 450 r.p.m. At the end of forty-eight hours there was a "mushy" mycelial growth in the tank. The pH of the medium was 5.2. One gram of nalidixic acid in 50 ml. of dimethylformamide was added to the tank and the fermentation continued for twenty-four hours. An aliquot was removed from the fermentor at twenty hours following the addition of the substrate. This aliquot was extracted and the extract analyzed for nalidixic acid and conversion product by the procedures described above. After a twenty-four hour conversion period, the fermentation was terminated.

The whole fermentation beer was acidified by the addition of 100 ml. 10 N HCl. The acidified beer was extracted twice with equal volumes of methylene dichloride. The extract was then concentrated under reduced pressure to a very small volume and the crystalline product that separated was collected by filtration. This product was recrystallized twice from ethyl acetate to yield about 0.4 g. of 1,4 - dihydro - 1-ethyl-7-hydroxymethyl-4-oxo-1,8-naphthyridine-3-carboxylic acid, M.P. 256–257° C.

*Analysis.*—Calcd. for $C_{12}H_{12}N_2O_4$: C, 58.06; H, 4.87; N, 11.29. Found: C, 57.71; H, 4.36; N, 11.33.

The structure of this compound was confirmed by its above elemental analyses; by its IR, UV and NMR spectra; by its permanganate oxidation to yield a compound identical with (same IR and UV spectra and mixed melting point undepressed) 1,4 - dihydro-1-ethyl-4-oxo-1,8-naphthyridine-3,7-dicarboxylic acid previously prepared by Lesher and Gruett as noted below; and, by establishing it to be identical with 1,4-dihydro-1-ethyl-7-hydroxymethyl-4-oxo-1,8-naphthyridine-3-carboxylic acid, M.P. 250–252° C., which had been shown to be a human metabolite of the corresponding 7-methyl compound, i.e. nalidixic acid. The structure of the human metabolite had been established by the following evidence: (a) its elemental analyses and its neutralization equivalent determination suggested a structure the same as that of nalidixic acid plus one hydroxyl group; (b) its IR spectrum was very similar to that of nalidixic acid, and, in addition, contained a strong absorption band attributable to an OH group; (c) its UV spectrum was like that of nalidixic acid; and, (d) permanganate oxidation of the metabolite yielded in a compound identical with (same IR and UV spectra and mixed melting point undepressed) 1,4-dihydro-1-ethyl-4-oxo-1,8-naphthyridine-3,7-dicarboxylic acid, which had been prepared previously by Lesher and Gruett by permanganate oxidation of 1,4-dihydro-1-ethyl-4-oxo-7-styryl-1-8-naphthyridine-3-carboxylic acid (U.S. Patent No. 3,149,104, issued Sept. 15, 1964, Example 45, column 25, lines 26–55).

The above 7-hydroxymethyl compound prepared by our above-described fermentative oxidation procedure was found to have IR, UV and NMR spectra identical with those of said metabolite of nalidixic acid; and the mixed melting point of these two compounds was undepressed, M.P. 253.5–254° C.

The above fermentative oxidation, while illustrating the use of *P. adametzi* to effect the oxidative conversion of a 7-methyl-1,8-naphthyridine to the corresponding 7-hydroxymethyl-1,8-naphthyridine, represents considerable work for such a small quantity of product. Further studies in shaker flasks revealed that higher levels of substrate could be successfully converted by the microorganism to form the 7-hydroxymethyl-1,8-naphthyridine. Successive fermentations were run at higher substrate levels with little decrease in product yields. Data from these fermentations are given in Table I.

TABLE I.—EFFECT OF NALIDIXIC ACID CONCENTRATION ON THE YIELD OF ITS 7-HYDROXYMETHYL ANALOG IN SHAKER FLASKS AS DETERMINED BY QUANTITATIVE PAPER CHROMATOGRAPHIC ANALYSIS

| Nalidixic Acid Concentration, grams/liter | Yield 7-Hydroxymethyl Analog, Percent |
| --- | --- |
| 0.1 | 72 |
| 0.5 | 71 |
| 1.0 | 66 |
| 1 2.0 | 82 |

[1] This conversion utilized washed cells instead of usual complete media plus cells.

Comparable yields of the 7-hydroxymethyl compound were obtained following the above procedure and using higher nalidixic acid concentrations, e.g., from 0.4 to 4.0 g./liter.

In the following Table II are listed other organisms which, when screened by the above-described general fermentative screening procedure, have been found to effect the oxidation of 1,4-dihydro-1-ethyl-7-methyl-4-oxo-1,8-naphthyridine-3-carboxylic acid to produce 1,4-dihydro-1 - ethyl-7-hydroxymethyl-4-oxo-1,8-naphthyridine-3-carboxylic acid.

TABLE II

Order: Hypocreales

| | |
| --- | --- |
| *Melanospora parasitica* | ATCC 11103 |

Order: Melanconiales

| | |
| --- | --- |
| *Septomyxa affinis* | ATCC 6737 |
| *Septomyxa affinis* | ATCC 13414 |

Order: Moniliales

| | |
| --- | --- |
| *Alternaria porri* (Ell.) Sacc | CBS |
| *Aspergillus alliaceus* | ATCC 10060 |
| *Aspergillus clavatus* | ATCC 9192 |
| *Aspergillus conicus* | ATCC 11911 |
| *Aspergillus fischerii* | ATCC 1020 |
| *Aspergillus flavipes* | ATCC 1030 |
| *Aspergillus flavus* | ATCC 9170 |
| *Aspergillus itaconicus* | ATCC 10021 |
| *Aspergillus malignus* | CMI 16061 |
| *Aspergillus nidulans* | ATCC 11267 |
| *Aspergillus niger* | ATCC 11394 |
| *Aspergillus ochraceus* | ATCC 12337 |
| *Aspergillus ustus* | ATCC 10032 |
| *Aspergillus wentii* | ATCC 1023 |
| *Beauveria densa* | ATCC 9452 |

TABLE II—Continued
Order: Moniliales—Continued

| | |
|---|---|
| *Botrytis cinerea* | ATCC 12481 |
| *Cephalosporium gregatum* | ATCC 11073 |
| *Curvularia falcata* (Tehon | CBS |
| *Curvularia lunata* (Wakker) Boedijn | CBS |
| *Gliocladium catenulatum* | ATCC 10523 |
| *Gliocladium roseum* | ATCC 10521 |
| *Gliocladium vermoeseni* | ATCC 10522 |
| *Penicillium aculeatum* | ATCC 10409 |
| *Penicillium aurantio-violaceum* | ATCC 10412 |
| *Pencillium beri compactum* | ATCC 9056 |
| *Penicillium canescens* | ATCC 10419 |
| *Penicillium charlesii* | ATCC 8730 |
| *Penicillium chermesinum* | ATCC 10424 |
| *Penicillium crrysogenum* | ATCC 10106 |
| *Penicillium expansum* | ATCC 7861 |
| *Penicillium frequentans* | ATCC 10444 |
| *Penicillium frequentans* | ATCC 10494 |
| *Penicillium lilacinum* | ATCC 10114 |
| *Penicillium nigricans* | ATCC 10115 |
| *Penicillium novae-zeelandiae* | ATCC 10473 |
| *Penicillium patulum* | ATCC 9260 |
| *Penicillium tardum* | ATCC 10503 |
| *Penicillium thomii* | ATCC 10506 |
| *Penicillium thomii* | ATCC 10596 |
| *Penicillium sp.* | ATCC 12556 |
| *Pleospora herbarum* (Pers.) | CBS |
| *Tricothecium roseum* | ATCC 8685 |
| *Tricothecium roseum* | ATCC 12519 |
| *Tricothecium roseum* | ATCC 12543 |

Order: Mucorales

| | |
|---|---|
| *Cunninghamella elegans* | ATCC 9245 |
| *Cunninghamella elegans* | ATCC 9246 |
| *Cunninghamella elegans* | ATCC 6795b(—) |
| *Cunninghamella verticillata* | ATCC 8983 |
| *Helicostylum piriforme* | ATCC 8992 |
| *Mortierella alpina* | ATCC 8979 |
| *Mucor mucedo* | ATCC 7941 |
| *Rhizopus oryzae* | ATCC 8477 |
| *Syncephalis nodosa* | ATCC 7943 |

Order: Sphaeriales

| | |
|---|---|
| *Botryospheria ribis* | ATCC 11232 |
| *Hypomyces rosellus* (alb. et Schiv. Tal.) | CBS |

Order: Spirogyrales

| | |
|---|---|
| *Syncephalolastrum racemosum* | ATCC 1332b(—) |

CBS indicates the organism was obtained from the Centraal Bureau voor Schimmelcultures, Netherlands.
ATCC=American Type Culture Collection number.
CMI=Commonwealth Mycological Institute number.
NRRL=Northern Regional Research Laboratory number.

EXAMPLE 2

1,4 - dihydro - 7-hydroxymethyl-4-oxo-1-n-propyl-1,8-naphthyridine-3-carboxylic acid was prepared from its 7-methyl analog following the procedures of Example 1. The 7-methyl compound dissolved in a minimal amount of dimethylformamide was added at two levels, 10 mg. and 30 mg., to 100 ml. cultures at *P. adametzi* (NRRL 737) in 500 ml. Erlenmeyer flasks grown on a rotary shaker for seventy-two hours at 25° C. After twenty-four hours incubation, the cultures were acidified with 2 ml. of 10 N HCl and extracted once with 100 ml. of dichloromethane and twice with 50 ml. of this solvent. The combined extracts were concentrated to 10 ml. and aliquots were analyzed by paper chromatography. These procedures showed the added substrate had completely disappeared and a new, more polar compound, the 7-hydroxymethyl analog had appeared. Table III shows the results of three tank fermentations with increasing substrate levels:

TABLE III.—TANK FERMENTATIONS OF THE 7-METHYL INTERMEDIATE

| 7-Methyl Intermediate, g./fermentor | 7-Hydroxymethyl Product, g./fermentor |
|---|---|
| 3 | 1.96 |
| 6 | 3.3 |
| 10 | 6.66 |

These three 10 liter fermentations were carried out following the procedure described in Example 1. The completed fermentations were acidified with 200 ml. of 10 N HCl and extracted with equal volumes of dichloromethane until no visible residue was left after evaporating a 200 ml. aliquot. The extracts from the tank with 3 grams of substrate were combined and concentrated to about 200 ml. The resulting solids were collected and recrystallized twice from absolute ethanol, once from ethyl acetate and finally from ethanol, using decolorizing charcoal, to yield 1,4-dihydro-7-hydroxymethyl-4-oxo-1-n-propyl-1,8-naphthyridine-3-carboxylic acid, a white crystalline product, M.P. 206.8–204.4° C. (corr.).

*Analysis.*—Calcd. for $C_{13}H_{14}N_2O_4$: C, 59.55; H, 5.38; N, 10.68. Found: C, 59.56; H, 5.29; N, 10.47.

The structure of the above 7-hydroxymethyl compound was further confirmed by its infrared spectrum and by its oxidation with alkaline permanganate to the corresponding 7-carboxylic acid compound, as follows: A mixture containing 1 g. of the fermentation product, 2 g. of potassium permanganate and 100 ml. of water containing about sixty drops of 10% aqueous potassium hydroxide solution was stirred for two hours at room temperature. The excess potassium permanganate was discharged using an aqueous solution of sodium bisulfite. The resulting manganese dioxide was filtered off and washed with water. The filtrate and washings were combined and acidified with HCl. The resulting white precipitate was collected and recrystallized from ethanol to yield 0.3 g. of 1,4-dihydro-4-oxo-1-n-propyl-1,8-naphthyridine-3,7 - dicarboxylic acid, M.P. 251.2–252.2° C. (corr.).

*Analysis.*—Calcd. for $C_{13}H_{12}N_2O_5$: C, 56.52; H, 4.38; N, 10.14. Found: C, 56.59; H, 4.29; N, 10.05.

There was no depression of melting point when the above product of the permanganate oxidation was mixed with 1,4 - dihydro-4-oxo-1-n-propyl-1,8-naphthyridine-3,7-dicarboxylic acid which had been prepared by permanganate oxidation of the corresponding 7-styryl compound.

EXAMPLE 3

1-allyl-1,4-dihydro - 7 - hydroxymethyl-4-oxo-1,8-naphthyridine-3-carboxylic acid was prepared from its 7-methyl compound following the procedures described in Example 1. Ten grams of 1-allyl-1,4-dihydro-7-methyl-4-oxo-1,8-naphthyridine-3-carboxylic acid in 75 ml. of dimethylformamide was added to a forty-eight hour old, 10 liter fermentation mixture containing *P. adametzi* (NRRL 737) as the microorganism. After forty-six hours, the completed fermentation was acidified with 200 ml. of 10 N HCl and extracted twice with equal volumes of dichloromethane. The combined extracts were concentrated to about 200 ml. and n-hexane added until no more materials separated. The solids were recovered by centrifugation and decantation, washed with n-hexane and recrystallized from absolute ethanol, using decolorizing charcoal, to yield 6.7 g. of the white crystalline product, 1-allyl-1,4-dihydro-7-hydroxymethyl - 4 - oxo-1,8-naphthyridine-3-carboxylic acid, M.P. 213.2–216.0° C. (corr.).

*Analysis.*—Calcd. for $C_{13}H_{12}N_2O_4$: C, 59.99; H, 4.65; N, 10.77. Found: C, 60.31; H, 4.35; N, 10.81.

The structure of the above 1-allyl-7-hydroxymethyl compound was further confirmed by reducing it to the corresponding 7-hydroxymethyl-1-n-propyl compound of Example 2, both compounds having the same infrared spectrum and melting point (mixed melting point undepressed).

EXAMPLE 4

1,4-dihydro-1-n-hexyl - 7 - hydroxymethyl-4-oxo-1,8-naphthyridine-3-carboxylic acid was prepared from its 7-methyl compound following the procedures of Examples 1 and 2 using *P. adametzi* (NRRL 737) as follows: Two fermentors, 10 liters each, were run as described in Example II. After two days incubation, 1 g. of 1,4-dihydro-1-n-hexyl-7-methyl - 4 - oxo-1,8-naphthyridine-3-carboxylic acid slurried in 30 ml. of dimethylformamide was added to each and incubated for two more days when paper chromatographic analysis indicated a successful fermentation. The tanks were harvested by acidifying with 200 ml. of 10 N HCl and extracting three times with equal volumes of dichloromethane. The extracts were combined and concentrated to about 100 ml. The precipitate that separated was collected and recrystallized twice from ethyl acetate to yield 363 mg. of the product, 1,4-dihydro-1-n-hexyl - 7 - hydroxymethyl-4-oxo-1,8-naphthyridine-3-carboxylic acid, M.P. 171.2–172.6° C. (corr.).

*Analysis.*—Calcd. for $C_{16}H_{20}N_2O_2$: C, 63.11; H, 6.63; N, 9.22. Found: C, 62.77; H, 6.76; N, 8.99.

Following the above-described general screening procedure using *Penicillium adametzi* (NRRL 737), the 1,4-dihydro-7-hydroxymethyl - 4 - oxo-1,8-naphthyridines of Table IV were prepared from their corresponding 1,4-dihydro-7-methyl-4-oxo-1,8-naphthyridine analogs.

TABLE IV

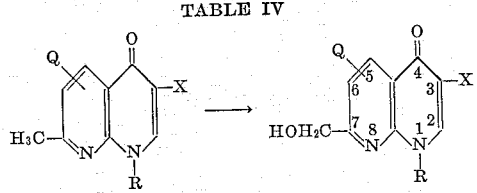

| Example | X | R | Q |
|---|---|---|---|
| 5 | COOH | CH₃ | H |
| 6 | COOH | CH₂C₆H₄—2—Cl | H |
| 7 | COOH | CH₂C(Cl)=CH₂ | H |
| 8ᵃ | COOC₂H₅ | C₂H₅ | H |
| 9 | COOH | CH₂CH(CH₃)₂ | H |
| 10 | COOH | CH₂C≡CH | H |
| 11 | COOH | CH₂CH=CHCH₃ | H |
| 12 | COOH | CH₂C(CH₃)=CH₂ | H |
| 13 | COOC₄H₉-n | C₂H₅ | H |
| 14 | CONHNH₂ | C₂H₅ | H |
| 15 | CN | C₂H₅ | H |
| 16 | COOH | CH(CH₃)₂ | H |
| 17 | COOH | CH₂CH₂OC₂H₅ | H |
| 18 | CONH₂ | C₂H₅ | H |
| 19 | CONHOH | C₂H₅ | H |
| 20 | COOH | CH₃ | 5-CH₃ |
| 21 | COOCH(CH₃)CH₂CH(CH₃)₂ | C₂H₅ | H |
| 22 | COOH | CH₂C₆H₅ | H |
| 23 | COOH | CH₂CH₂C₆H₁₁ | H |
| 24 | COOH | CH₂CH₂N(C₂H₅)₂·HCl | H |
| 25 | COOCH₂CH₂N(CH₃)₂·HCl | C₂H₅ | H |
| 26 | COOH | C₂H₅ | 6-Br |
| 27 | COOH | C₂H₅ | 5-CH₃-6-Br |
| 28 | COOH | CH₂CH₂OCH₂C₆H₅ | H |
| 29 | COOH | CH₂CH₂CH₃ | 6-CH₃ |
| 30 | COOH | CH₃ | 6-CH₃ |

ᵃ Alkaline hydrolysis of this 7-hydroxymethyl product yielded the corresponding acid (where X is COOH), which was found to be identical with the 7-hydroxymethyl analog of nalidixic acid of Example 1 above (same IR spectrum and mixed melting point undepressed).

EXAMPLE 31

Following the general screening procedure used to prepare the compounds of Table IV and using *P. adametzi* (NRRL 737), 4-hydroxy - 7 - hydroxymethyl-1,8-naphthyridine-3-carboxylic acid was prepared from 4-hydroxy-7-methyl-1,8-naphthyridine-3-carboxylic acid.

We claim:

1. The process for converting the methyl radical attached in the 7-position of the 1,8-naphthyridine nucleus to the hydroxymethyl radical which includes subjecting a compound containing said substituent on said nucleus to the fermentative enzymatic action of an organism classified in the orders Moniliales, Mucorales, Hypocreales, Melanconiales, Sphaeriales and Spirogyrales, capable of effecting said conversion; and, recovering from the fermentation reaction mixture the 7-hydroxymethyl-1,8-naphthyridine.

2. The process according to claim 1 in which the 7-methyl-1,8-naphthyridine has a 4-oxo group and a 3-carboxylic acid group.

3. The process according to claim 1 in which the 7-methyl-1,8-naphthyridine has a 4-hydroxy group and a 3-carboxylic acid group.

4. The process according to claim 1 in which the microorganism is *Penicillium adametzi*.

5. The process for preparing a 1,4-dihydro-7-hydroxymethyl-1-(lower-alkyl)-4 - oxo - 1,8-naphthyridine-3-carboxylic acid which comprises subjecting the corresponding 7-methyl compound to the fermentative enzymatic action of a microorganism of the order Moniliales capable of converting the 7-methyl radical to the 7-hydroxymethyl radical; and, recovering the 7-hydroxymethyl compound from the fermentation reaction mixture.

6. The process for preparing a 1,4-dihydro-7-hydroxymethyl-1-(lower-alkyl)-4 - oxo - 1,8-naphthyridine-3-carboxylic acid which comprises subjecting the corresponding 7-methyl compound to the fermentative enzymatic action of a microorganism of the genus Penicillium and recovering from the fermentation reaction mixture the 7-hydroxymethyl reaction product.

7. The process for preparing a 1,4-dihydro-7-hydroxymethyl-1-(lower-alkyl)-4 - oxo - 1,8-naphthyridine-3-carboxylic acid which comprises subjecting the corresponding 7-methyl compound to the fermentative enzymatic action of a microorganism of the genus Aspergillus and recovering from the fermentation reaction mixture the 7-hydroxymethyl reaction product.

8. The process of preparing 1,4-dihydro-1-ethyl-7-hydroxymethyl-4 - oxo - 1,8-naphthyridine-3-carboxylic acid which comprises subjecting the corresponding 7-methyl compound to the fermentative enzymatic action of *Penicillium adametzi* and recovering from the fermentation reaction mixture the 7-hydroxymethyl reaction product.

9. The process of preparing 4-hydroxy-7-hydroxymethyl-1,8-naphthyridine-3-carboxylic acid which comprises subjecting the corresponding 7-methyl compound to the fermentative enzymatic action of *Penicillium adametzi* and recovering from the fermentation reaction mixture the 7-hydroxymethyl reaction product.

References Cited by the Examiner

UNITED STATES PATENTS 3,149,104  9/1964  Lesher et al. _____ 260—240

FOREIGN PATENTS 599,835  6/1940  Canada.

A. LOUIS MONACELL, *Primary Examiner.*

D. M. STEPHENS, *Assistant Examiner.*

UNITED STATES PATENT OFFICE
CERTIFICATE OF CORRECTION

Patent No. 3,317,401                                              May 2, 1967

Eldon D. Nielson et al.

It is hereby certified that error appears in the above numbered patent requiring correction and that the said Letters Patent should read as corrected below.

Column 1, lines 45 and 46, for "Klebisella", in italics, read -- Klebsiella --, in italics; line 46, for "coil", in italics, read -- coli --, in italics; column 5, line 12, for "beri", in italics, read -- brevi- --, in italics; line 16, for "crrysogenum", in italics, read -- chrysogenum --, in italics; line 64, for "at" read -- of --; column 6, line 25, for "204.4°" read -- 209.4° --.

Signed and sealed this 9th day of January 1968.

(SEAL)
Attest:

Edward M. Fletcher, Jr.

Attesting Officer

EDWARD J. BRENNER

Commissioner of Patents